United States Patent [19]

Bourges

[11] 4,218,960

[45] Aug. 26, 1980

[54] RAM WITH TWO-PART PISTON ROD

[75] Inventor: Bernard M. Bourges, Le Plessis Belleville, France

[73] Assignee: Societe Anonyme POCLAIN, Belleville, France

[21] Appl. No.: 947,072

[22] Filed: Sep. 29, 1978

Related U.S. Application Data

[63] Continuation of Ser. No. 806,274, Jun. 13, 1977, abandoned.

[30] Foreign Application Priority Data

Jul. 5, 1976 [FR] France ................................ 76 20508

[51] Int. Cl.[2] ............................ F16J 1/12; F01B 3/00; F01B 31/00

[52] U.S. Cl. ......................................... 92/111; 92/113; 92/116; 92/166

[58] Field of Search ................. 92/113, 116, 110, 111, 92/166

[56] References Cited

U.S. PATENT DOCUMENTS

| | | | |
|---|---|---|---|
| 2,542,866 | 2/1951 | Grossman | 92/116 |
| 2,740,258 | 4/1956 | Weber | 92/116 |
| 2,886,007 | 5/1959 | Manchester | 92/116 |
| 3,398,924 | 8/1968 | Lothroy | 92/113 |
| 3,759,564 | 9/1973 | Seaberg . | |
| 3,881,263 | 5/1975 | Coeurderoy . | |

FOREIGN PATENT DOCUMENTS

| | | |
|---|---|---|
| Ad.79892 | 12/1963 | France . |
| 2226353 | 11/1974 | France . |

*Primary Examiner*—Paul E. Maslousky
*Attorney, Agent, or Firm*—Lewis H. Eslinger

[57] ABSTRACT

The invention relates to a ram comprising a piston rod in two parts mounted for relative rotation.

A first part extends out of the cylinder, beyond each of the heads, while the second part extends out of the cylinder only beyond one head, namely the upper one, and comprises two axial shoulders directed in opposite directions, located at the two ends of this second part and each cooperating with a shoulder, fast with the first part, corresponding to the maintenance of a fixed relative axial position between the two parts, and two radial bearing surfaces located at the two ends of the second part and cooperating with two radial bearing surfaces fast with the first part, corresponding to the centering of the two parts. The present invention is particularly applied to a rotatable clam-shell bucket.

4 Claims, 2 Drawing Figures

RAM WITH TWO-PART PISTON ROD

This is a continuation of application Ser. No. 806,274, filed June 13, 1977, now abandoned.

The present invention relates to a ram whose piston rod is in two parts.

Rams are already known whose piston rod is made of two separate parts mounted for relative rotation about their common axis.

Certain clam-shell buckets with which hydraulic loading shovels are equipped, are provided with such rams. The construction obtained by using these rams makes it possible to manufacture rotatable buckets suspended by their piston rod, and therefore improved, light buckets, as they do not require heavy accessories with which are equipped rotatable clam-shell buckets having a control ram with monobloc piston rod. This construction is further advantageous since the rotation mechanism may be mechanically well protected.

In known rams, the two parts of a piston rod are mounted to rotate inside the cylinder of the ram. In view of the small dimensions of the space available, the construction is made from numerous small elements and is consequently expensive.

It is an object of the invention to remedy this drawback by proposing a novel ram applicable particularly, but not exclusively, to the production of clam-shell buckets, in which the rotary assembly of the two parts of its piston rod is partially located outside of the cylinder, at a spot which is less encumbered and more accessible.

The invention therefore relates to a ram constituted by a cylinder defined by two heads, a piston mounted to slide inside this cylinder and a piston rod which is securely fixed to the piston in translation, which passes through the said two heads and which comprises two coaxial parts, fast in translation and mounted for relative rotation with respect to their common axis, whilst a first of said two parts extends out of the cylinder beyond each of said heads and the second part extends out of the cylinder beyond one of these heads only, namely the upper head, substantially between the piston and at least the end of the first part which emerges from the cylinder at said upper head end and comprises, on the one hand, an axial recess for passage, in which is disposed the half of the first part located at the upper head end, and on the other hand, two radial centering bearing surfaces, one located near the piston; the other near the outer end of the second part and cooperating with two radial bearing surfaces, fast with the first part, corresponding to the centering of the two parts.

The second part comprises two axial shoulders directed in opposite directions, one located near the piston, the other near the outer end of this second part and each cooperating with a shoulder, fast with the first part, corresponding to the maintenance of a fixed relative axial position between the two parts.

According to another feature of the invention, the end of the second part, near the piston, comprises a flat transverse face, which is in abutment on a shoulder of the piston.

According to a further feature, the outer end of the second part comprises a flat transverse face, whilst a sleeve, separate from the first part, is removably fixed on the end of the first part adjacent the outer end of the second part and comprises a flat transverse face which is in contact with the flat face of the outer end of the second part.

According to yet a further feature, the outer end of the second part comprises a centering recess which is defined by a cylindrical bore and contains said sleeve, itself fast in rotation with the first part and comprising a cylindrical bearing surface in contact with this bore, whilst the end of the second part, near the piston, comprises a cylindrical bearing surface contained in a bore made in this piston, an annular space is made between the recess for passage of the second part and the first part, and the seal is effected between:

- the cylindrical bearing surface of the end of the second part adjacent the piston and the bore of said piston,
- the cylindrical bearing surface of the sleeve and the bore of the centering recess,
- the sleeve and the first part of the rod and this annular space communicates with the outer cylindrical face of the second part of the rod and constitutes the main fluid supply conduit for a chamber of the ram with which it is also in communication.

The invention will be more readily understood on reading the following description with reference to the accompanying drawings, in which.

Figure 1:
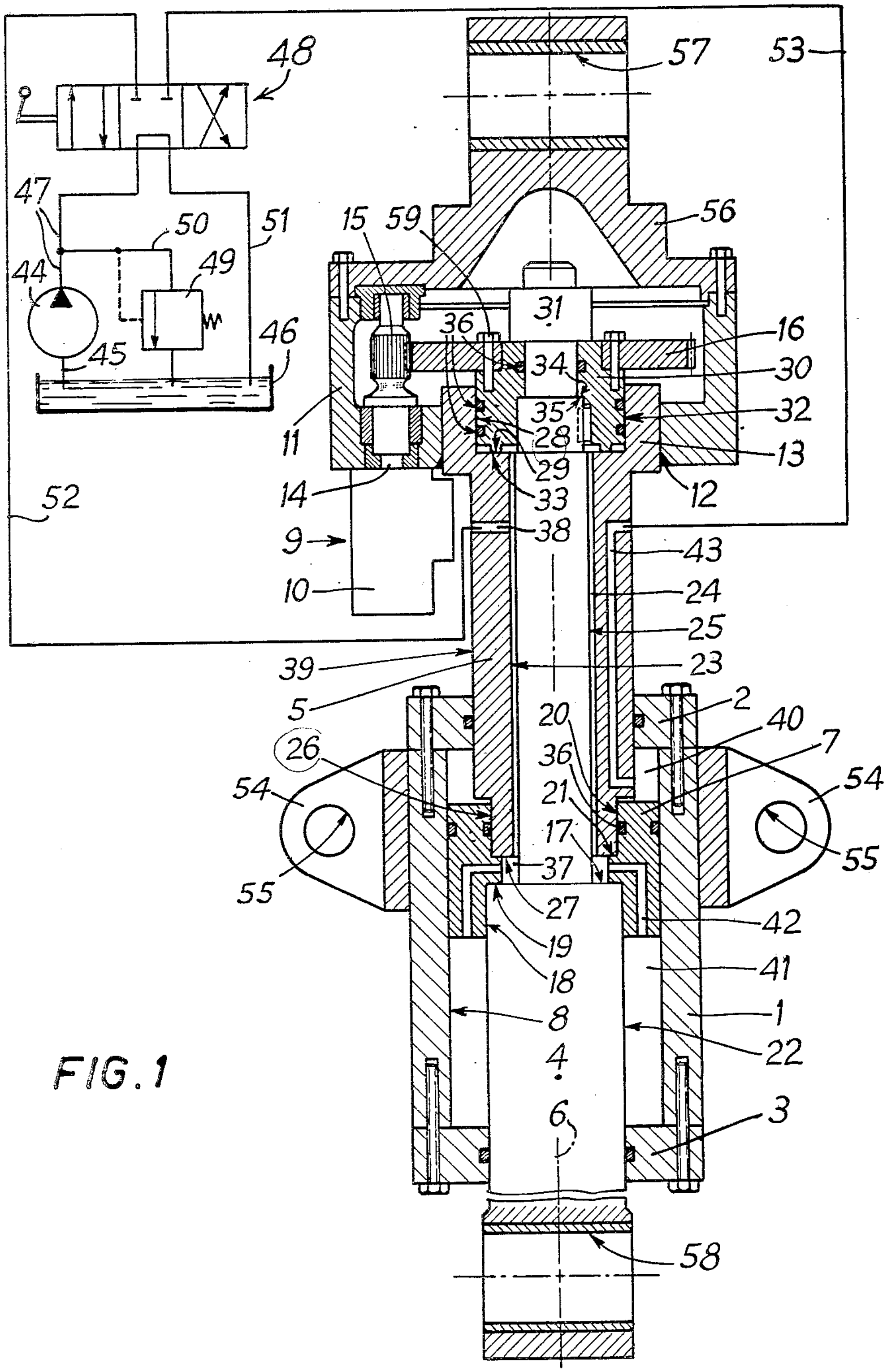
FIG. 1 is an axial section through a ram according to the invention.

Referring now to the drawings, FIG. 1 shows a ram which is constituted by:

- a cylinder 1 limited by two opposite heads 2 and 3,
- a piston rod in two parts, 4 and 5, which is fast in translation, along the axis 6 of the cylinder, with a piston 7 mounted to slide in a bore 8 of said cylinder,
- a motor 9, for driving in rotation, the frame 10 of which is fixed to a casing 11 welded at 12 to one end 13 of the second part 5 of the piston rod, and the driven shaft 14 of which is provided with a gear 15 which meshes with a gear 16 fast with the first part 4 of the piston rod.

The first part 4 of the piston rod emerges from the cylinder 1 at both heads 2, 3, passing through the lower head 3 in tight manner. Its upper half is undercut and is connected to the lower half by a shoulder 17 with which said latter is provided. The piston 7 has two recesses, the first defined by a cylindrical bore 18 of diameter equal to that of the face 22 of the lower half of the first part 4 of the rod and by a flat transverse face 19, the second by a cylindrical bore defining a bearing surface 20 and by a flat transverse face 21.

The second part 5 of the piston rod emerges from the cylinder 1 only through the upper head 2, in tight manner. It presents an internal recess 23 through which passes the undercut upper half of the first part 4 of the rod, a space 24 being made between the recess 23 and the cylindrical face 25 of said upper half. The lower end of this second part 5 of the rod is itself undercut and defined by a cylindrical face 26 of diameter equal to that of the bore 20 of the piston, and by a flat, end transverse face 27. The upper end of the second part 5 of the rod comprises a recess defined by a bore 28 and by a flat transverse face 29.

The end of the first part 4 close to end 13 is disposed opposite the bore 28, whilst a sleeve 30 is fixed thereto by means of a nut 31, is defined by a cylindrical face or bearing surface 32, of diameter equal to that of the bore 28 and by a transverse support face 33 and is introduced in the bore 28. Shoulders 34 and 35 with which the rod 4 and sleeve 30 are respectively provided, allow a firm support of the latter on rod. It will be noted that the gear 16 is made fast with the first part 4 by being fixed to the sleeve 30 by screws 59 and that a pin connects the sleeve 30 and part 4 in rotation.

Surfaces 26 and 28 define radial centering cylindrical bearing surfaces in the device for the parts 4 and 5.

It will be noted that O-rings 36 are interposed between the following elements:

bore 28 and cylindrical face 32, first part 4 of the rod and sleeve 30, bore 20 of the piston and cylindrical face 26 disposed thereopposite. Furthermore, the space 24 opens into a chamber 37 defined by the two parts 4 and 5 of the piston rod and the piston 7.

A transverse conduit 38, made in the wall of the second part 5 of the rod, connects the outer face 39 of this part 5 with the space 24. Finally, the piston 7 defines, in the cylinder 1, an upper chamber 40 and a lower chamber 41. A conduit 42, made in piston 7, connects the chambers 37 and 41, whilst a conduit 43, made in the second part 5 of the rod, connects the cylindrical face 39 thereof to chamber 40.

A pump 44 is connected, via its suction conduit 45, to a fluid tank 46 and via its delivery conduit, to a three-way fluid distributor 48. A calibrated discharge valve 49 is disposed in a conduit 50 connecting the delivery conduit 47 to the tank 46. Finally, conduits 51, 52, 53 connect the distributor 48, respectively, to tank 46, conduit 38 and conduit 43.

The three positions of the distributor 48 correspond as follows:

the first position corresponds to the communication of conduits 47 and 52, and of conduits 51 and 53;

the second position, to the communication of conduits 47 and 51 and the obturation of conduits 52 and 53, and the third position to the communication of conduits 47 and 53, and of conduits 52 and 51.

It will be noted that the ram which has been shown is intended to animate a clam-shell bucket and consequently comprises the following arrangements:

two lugs 54 are fixed to the cylinder 1 and each comprises a hole 55 for the pivoting of the control arms of the shells of the bucket;

the casing 11 is closed by a lid 56 which comprises a bearing 57 allowing the ram-bucket assembly to be mounted on the boom of a public works machine;

the lower end of the first part 4 of the piston rod comprises a bearing 58 allowing assembly of the shells of the clam-shell bucket.

Figure 2:
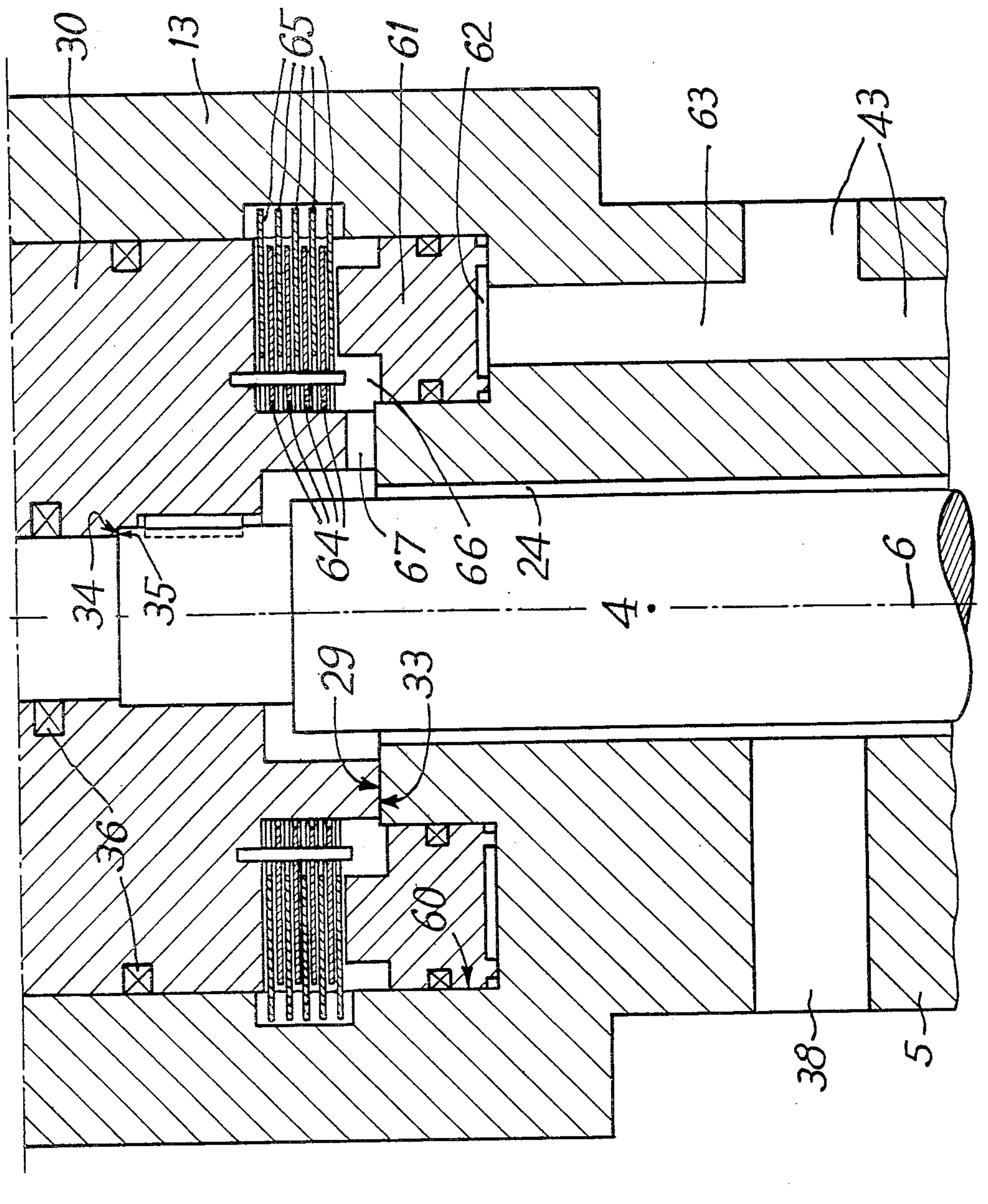
FIG. 2 is an axial section through a variant embodiment of the ram of FIG. 1.

The variant embodiment of FIG. 2 repeats and completes the previous arrangements.

It should be noted that an annular housing 60 is arranged in the end 13 of the second part 5 of the piston rod. A piston 61 is mounted to slide in the housing 60, in which it defines a fluid admission chamber 62, connected to conduit 43 by a conduit 63.

Discs 64, fast in rotation with the sleeve 30 and therefore with the first part 4, are interposed between discs 65 fast in rotation with the second part 5, these discs and piston 61 as a whole constituting a disc brake rendering the two parts 4 and 5 of the piston rod fast when the pressurised fluid fills chamber 62.

The ram which has been shown presents the following advantages.

Firstly, part of the rotation assembly of the two parts 4 and 5 of the rod is placed at the end 13 of the second part 5, in a zone located outside of cylinder 1. A rotation assembly may easily be made of the sleeve 30 (cylindrical face 32 and transverse face 33) in the end 13 (bore 28 and transverse face 29) in an accessible and relatively less encumbered zone, allowing a satisfactory choice of the dimensions of the various elements. The assembly of the piston 7 and the two parts 4 and 5 is noted to be simple and to reduce, in a manufactured ram, the number of parts by about 30% with respect to prior known rams.

Furthermore, the existence of the space 24 may be profitably used to constitute the supply conduit of one of the two chambers of the jack, in the present case that of chamber 41. To this end, it is sufficient to ensure the tightness in the zone of the sleeve 30 by means of the O-rings 36.

The function of the motor 9 is readily understood, it being to allow adjustment of the relative angular orientation of the two parts 4 and 5 of the rod.

However, this adjustment of the angular orientation is not always desired. If it is not desired, it is no longer necessary to provide the motor 9. However, the bucket must be prevented from slewing, when it is unloaded, in a position not corresponding to the location of the unloading. The disc brake of FIG. 2 solves the problem. The opening of the bucket corresponds to the admission of pressurised fluid in the chamber 40, thus in conduit 43. This fluid, through conduit 63, also supplies chamber 62 and pushes the piston 61 of the brake. Thus, during the unloading of the bucket, the two parts 4 and 5 of the latter are rendered fast in rotation, this momentarily fixing the orientation of said bucket.

The loosening of the brake may result from the simple communication of the conduit 43 with the tank 46. However, it may also be controlled by communicating the chamber 66, opposite chamber 62, with the space 24, via a conduit 67 made in the sleeve 30. Then, when the pressurised fluid is admitted into the supply space 24 of the chamber 41, it is also admitted into chamber 66 and pushes the piston 61 into non-braking position.

A study of the axial efforts produced during operation of the ram shows, on the one hand, the presence of pressurised fluid in the zone of the transverse faces 29 and 33 (fluid coming from conduit 38) and, on the other hand, the creation of a veritable hydraulic stop in this zone, in view of the constitution of said faces and the establishment of the pressure on either side of the face 33. Thus, the efforts of contact between said two faces 29 and 33 do not give rise to any force, not to any considerable friction torque.

It should also be noted that the choice of the diameter of the sleeve 30 enables the value of the thrust of the fluid on this sleeve to be adjusted and therefore the value of the contact forces between the faces 29 and 33 to be adjusted.

Finally, the interest should be noted in having obtained a constant lubrication and total protection of this stop, ensuring resistance of the stop to wear in service and virtually non-existent maintenance.

What is claimed is:

1. A ram comprising a cylinder having a pair of opposed upper (2) and lower heads (3), a piston (7) mounted to slide inside said cylinder, and a composite piston rod (4, 5), securely fixed to said piston for movement therewith in translation, said composite piston rod passing through both of said heads and comprising two coaxially positioned parts (4, 5) operatively arranged with each other for concurrent movement in translation and relative rotation with respect to each other about their common axis, the first (4) of said two parts having opposed ends respectively extending out of said cylinder beyond each of said heads (2, 3), and said second part (5) extending out of the cylinder (1) beyond only the upper head (2) from a position substantially adjacent to piston (7) to an outer end adjacent at least the end (31, 34) of the first part (4) which emerges from the cylinder at said upper head end, said second part (5) having an axial recess (23) formed therein defining a passage (24) which receives that portion of the upper part (4) which is located at the upper head end of the cylinder, said second part also having two radial centering cylindrical bearing surfaces formed thereon (26, 28) respectively located near the piston (7) and near the outer end of the second part (5) outside the cylinder (1) above said upper head (2), said piston having a first radial cylindrical bearing surface (20) formed thereon cooperating with and engaging the adjacent radial bearing cylindrical surface (26) of the second part and said first part having a sleeve (30) secured to its outer end having an outer surface defining a second radial cylindrical bearing surface (32) formed thereon cooperating with and engaging the adjacent radial cylindrical bearing surface (28) at the outer end of the second part for centering the two parts with respect to each other, said second part (5) also including a pair of shoulders (27, 29) extending perpendicularly to the axis (6) of the composite rod and facing in opposite directions, said shoulders (27, 29) being respectively located adjacent to piston (7) and the outer end (30) of said second part and said piston having a shoulder (21) formed thereon and said sleeve having a shoulder (33) formed thereon, said shoulders on the piston and sleeve extending perpendicularly to the axis of the rod and facing each other and being respectively located to engage the shoulders of the second part for cooperation therewith to maintain a fixed relative axial position between the two parts.

2. The ram as recited in claim 1, wherein an inner end of the second part (5), near the piston (7), comprises a flat transverse face (27) defining one of the shoulders of the second part; said shoulder of the piston and said transverse face being in abutment.

3. The ram as recited in claim 1, wherein the outer end (13) of the second part (5) has a flat transverse face (29) defining one of the shoulders of the second part; said sleeve (30) being separate from the first part (4), removably fixed on the end of the first part (4) adjacent the outer end (13) of the second part (5), and having a flat transverse face (33) formed thereon defining said shoulder (33) thereon, said flat transverse faces (29, 33) being in contact with each other.

4. The ram as recited in claim 3, wherein the outer end (13) of the second part (5) has a centering recess formed therein defined by a cylindrical bore (28), said bore (28) containing said sleeve (30) and having an inner surface defining the radial cylindrical bearing surface (28) near the outer end of the second part (5), the cylindrical outer surface (32) of said sleeve being in contact with said bore (28), and said piston (7) having a bore (20) formed therein defining said first radial cylindrical bearing surface which receives the outer cylindrical bearing surface (26) of the second part (5), said first (4) and said second (5) parts defining an annular space (24) therebetween, and a plurality of seals respectively formed between (i) the cylindrical bearing surface (26) at the end of the second part (5) adjacent the piston (7) and the bore (20) of the piston (7), (ii) the cylindrical bearing surface (32) of the sleeve (30) and the bore (28) of the second part (5), and (iii) the sleeve (30) and the first part (4) of the rod, said annular space (24) communicating (38) with the outer cylindrical face (39) of the second part (5) of the rod and constituting the main fluid supply conduit for a chamber (41) of the ram with which it is also in communication (37–42).

* * * * *